(12) United States Patent
Hamilton

(10) Patent No.: US 6,968,316 B1
(45) Date of Patent: Nov. 22, 2005

(54) SYSTEMS, METHODS AND COMPUTER PROGRAM PRODUCTS FOR PRODUCING NARRATIVE FINANCIAL ANALYSIS REPORTS

(75) Inventor: Brian Hamilton, Cary, NC (US)

(73) Assignee: Sageworks, Inc., Raleigh, NC (US)

( * ) Notice: Subject to any disclaimer, the term of this patent is extended or adjusted under 35 U.S.C. 154(b) by 661 days.

(21) Appl. No.: 09/590,486

(22) Filed: Jun. 8, 2000

Related U.S. Application Data

(60) Provisional application No. 60/163,502, filed on Nov. 3, 1999.

(51) Int. Cl.[7] .............................................. G06F 17/60
(52) U.S. Cl. ........................ 705/36; 705/10; 715/530; 715/531
(58) Field of Search .............................. 705/30, 35, 36, 705/42, 10; 715/530, 531

(56) References Cited

U.S. PATENT DOCUMENTS

| | | | | |
|---|---|---|---|---|
| 4,989,141 | A | | 1/1991 | Lyons et al. ................. 364/408 |
| 4,992,939 | A | * | 2/1991 | Tyler ............................... 704/9 |
| 5,189,608 | A | | 2/1993 | Lyons et al. ................. 364/408 |
| 5,500,795 | A | | 3/1996 | Powers et al. ............... 364/401 |
| 5,684,964 | A | | 11/1997 | Powers et al. ............... 395/211 |
| 5,799,286 | A | | 8/1998 | Morgan et al. ................ 705/30 |
| 6,078,924 | A | * | 6/2000 | Ainsbury et al. ............ 707/101 |
| 6,513,019 | B2 | * | 1/2003 | Lewis ........................... 705/35 |
| 6,651,219 | B1 | * | 11/2003 | Elliott ......................... 715/530 |

OTHER PUBLICATIONS

Private Co.Com; www.privateco.com.
Entrepreneurial Edge Online, www.edgeonline.com.
"With Insight Accounting Software, You Not Only Capture the Numbers, You Can Interrogate Them," INSIGHT Accounting Software by Layered, pp. 1-2 (May 1987).

* cited by examiner

*Primary Examiner*—Hani M. Kazimi
*Assistant Examiner*—Stefano Karmis
(74) *Attorney, Agent, or Firm*—Jenkins, Wilson & Taylor, P.A.

(57) ABSTRACT

Systems, methods, and computer program products for generating a narrative financial analysis of a financial statement of a business entity are provided. Financial information about a business entity is obtained from a user. A set of financial values is calculated based on the received financial information. The calculated values are compared to values calculated for the same business entity over time or to different business entities in the same industry. Scores are assigned to the financial values based on the comparison. For each combination of scores, text is dynamically selected to generate a narrative financial analysis report. The narrative financial analysis report includes text that explains the meaning of each combination of scores in a narrative format.

46 Claims, 16 Drawing Sheets

TO FIG. 3B.

FROM FIG. 3A.

Enter Your Financial Data
(as of the end of the period)

| | Current Period | | Previous Period | |
|---|---|---|---|---|
| Sales or Revenue | $ 1,000,000 | 43a | $ 800,000 | 44a |
| Cost of Sales (Cost of Goods Sold) | $ 500,000 | 43b | $ 500,000 | 44b |
| Net Profit Before Taxes | $ 55,000 | 43c | $ 65,000 | 44c |
| Cash | $ 1,000 | 43d | $ 1,000 | 44d |
| Accounts Receivable | $ 10,000 | 43e | $ 40,000 | 44e |
| Current Assets | $ 35,000 | 43f | $ 60,000 | 44f |
| Gross Fixed Assets | $ 100,000 | 43g | $ 50,000 | 44g |
| Current Liabilities | $ 25,000 | 43h | $ 35,000 | 44h |
| Total Liabilities (Total Debt) | $ 75,000 | 43i | $ 89,000 | 44i |
| Total Employees + Full time Contractors | 100 | 43j | 90 | 44j |

Select Your Industry, Click here  Provides Contract Research Organization (CRO) ◀ ▶ —45
Services. Products are reports and studies.

Company Name for the report: Typical CRO Business —46

Please answer the following questions very carefully —47

What accounting method does your company use?
47a— ● Accrual basis  ○ Cash basis  ○ I don't know After you send a customer a bill, how long does it generally take to get paid?
47b— ○ 0-10 days  ● 11-40 days  ○ Over 40 days

FROM FIG. 3B.

After you receive a bill from a vendor/supplier, how long does it generally take you to pay it?
47c → ○ 0-10 days  ⦿ 11-40 days  ○ Over 40 days How long have you been in business?
47d → ⦿ 0-2 years  ○ 3-5 years  ○ 6-10 years  ○ Over 10 years Which would best describe the accuracy of your financial statements?
47e → ○ Very accurate  ⦿ Pretty accurate  ○ Not so accurate  ○ I don't know Which factor below, if managed properly, BEST levers profits in your business?
47f → ○ People  ○ Assets  ⦿ Debt  ○ Information & Technology  ○ None of the Above 48 → [Process My Report]  [Reset]

HOME | THE TECHNOLOGY | SECURITY | PURCHASE | OUR STORY | SITEMAP

Document: Done

FIG. 3C.

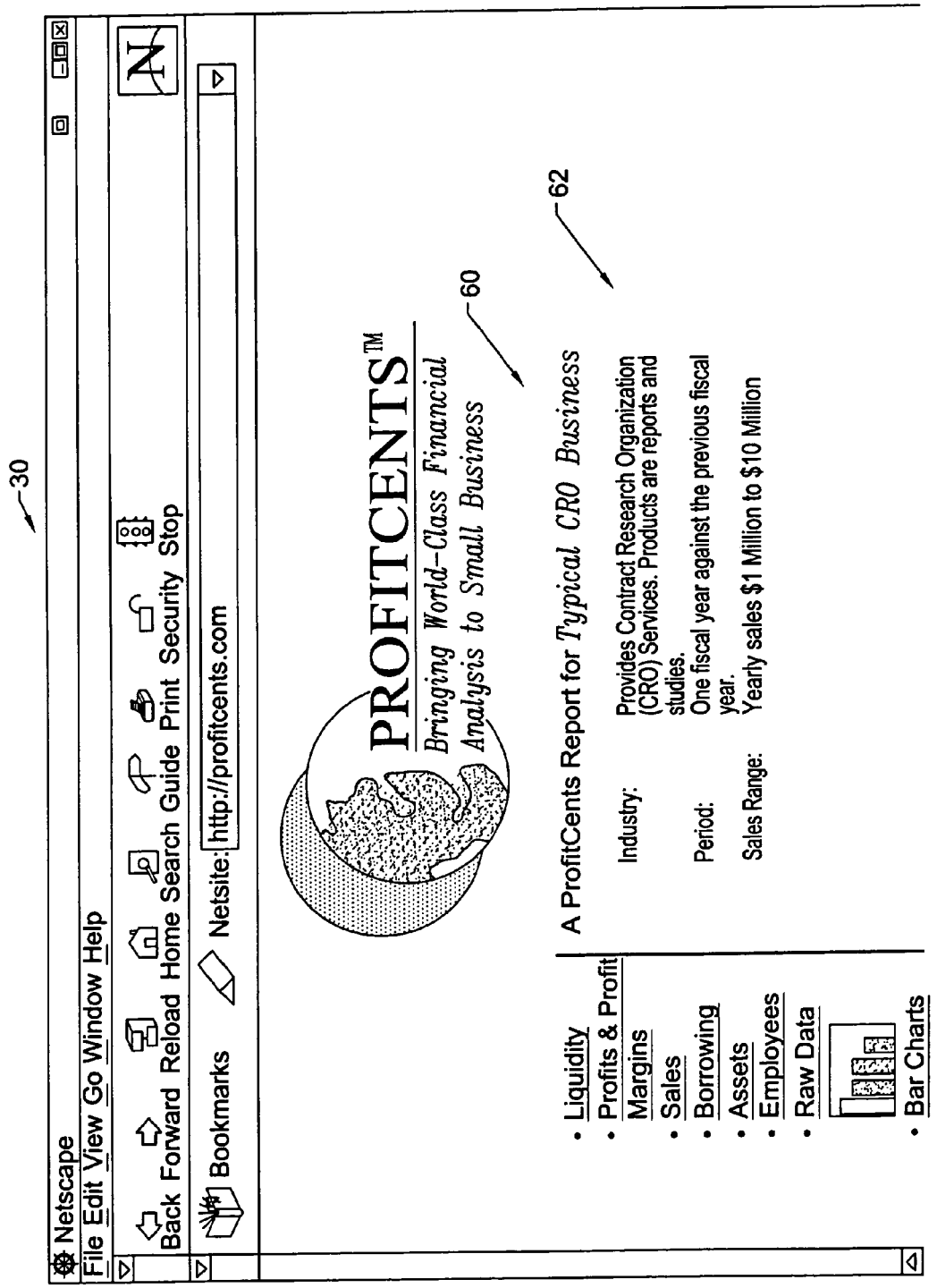

FIG. 4C.

FROM FIG. 4B.

Use COD for marginal customers. 7) "Term out" some short-term debt by refinancing. Basically, management can move some short-term debt to long-term debt.

Profits & Profit Margins
— 66

*Are we profitable?*
This company performed very well in the gross profit area. Not only did managers increase sales and gross profits, but they also improved gross margins. This shows us that the company is effectively managing sales increases. Increasing the gross margin is a key component to long-term success: it allows the company to use gross profits as a form of leverage.

However, on the net profit side, results are less positive. Despite earning higher gross profits, both net profitability and net profit margins fell from last period. How did the company do this? Basically, managers spent significantly more money on operating costs this period. This dynamic could eventually lead to trouble if continued over the long run.

This is all the more true because net profit margins are now low even when compared to other similar companies. Specifically, this company is not generating enough net profitability for its sales level.

★ — 67

*POOR*

TO FIG. 4D.

FROM FIG. 4C.

From these results, it would seem that managers should go through operating costs (G&A) costs and isolate the costs that are out of line. It could be that the company is making strategic investments in some costs. Otherwise, managers need to find out which costs might need to be adjusted. An important question to consider is the point in sales at which the company is most profitable. In other words, what is the optimal relevant range-sales and production level? Many businesses require a certain level of sales to earn profits. What is this company's? It is possible that the company has reached another operating range—the point at which managers need to begin growing sales significantly.

Finally, management must make sure that consulting revenue is diversified. It is easy to become dependent upon single customer relationships or single lines of services. It's interesting to note that larger and successful companies are now offering more and different types of services than they did five years ago.

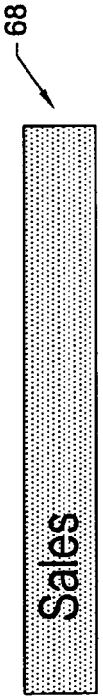

68

Sales

*Are sales growing and satisfactory?*

FROM FIG. 4D.

We're seeing nice results in this area. Sales have increased substantially. It looks like the company has also bought a substantial amount of assets, and it looks like additional people have been hired. The company is also generating more revenue per employee this period, a long run key performance indicator (KPI) in this particular industry. However, we won't draw too many conclusions in this section because the real goal is increasing profitability over time, as discussed in the profitability area. Sales increases, in and of themselves, do not tell us that much.

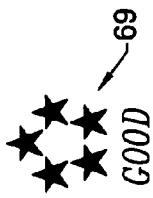

GOOD ~69

Borrowing ~70

*Are we borrowing profitably?*
Both net profitability and total debt fell from last period. The drop in profitability had already been discussed in the "Profitability" section of the report. The reason that these results are considered rather good is that total debt fell faster than profitability. If resources such as debt can be reduced over time, profitability will generally increase in the long run. This is because resources cost money so the less of them being carried by the company, the more profitability that can be built into the company. It is generally most beneficial to maintain the leanest resource base possible to generate the level of profitability desired.

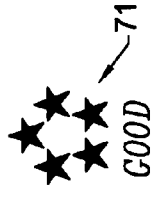

GOOD ~71

FROM FIG. 4E.

★ RISKY — 73

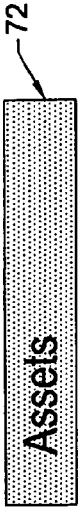

*Are we using our fixed assets effectively?*

Because fixed assets do not appear on the profit/loss statement, managers often forget to consider them in terms of how they affect profitability. Nevertheless, the profit/loss statement is a symptom not a cause. Buying fixed assets can actually help a company earn higher profits if it is done in the correct manner.

However, in this case it looks like the assets bought may not be performing optimally, because buying them has not increased profitability. Indeed, profitability is down from last period. There is no logic in purchasing additional assets if they will not help generate additional profitability. This is especially true given that the profit margins and overall liquidity are down, too. Althought it is possible that the assets recently purchased need some time to start operating at their maximum levels, managers may want to be particularly careful about making purchases at this time.

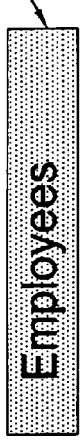

*Are we hiring effectively?*

RISKY ← 75

The results in this area make us a little uneasy. This is because the company has hired more people, but net profitability has fallen from last period. Ideally, we want to see hiring result in higher profitability. During this period, this did not happen. In fact, the reverse occurred.

Unless it is the stated strategy to invest in more employees for the long run, managers may want to think hard about future hiring decisions until they can move net profitability higher. This is especially true because the company added a significant amount of fixed assets and needs to give those assets time to start producing more profitability as well.

However, let's end this section and the report by revealing some important notes. While it is true that the methods used here are sound and based upon existing financial analysis, financial analysis is limited because it looks backward not forward. This is a real limitation, which should be noted by the reader. For example, good hiring decisions should be based upon an analysis of future conditions, not what has happened already.

"I criticize by creation—not by finding fault." - Cicero

FROM FIG. 4G.

| Raw Data — 76 | Current Period | Previous Period |
|---|---|---|
| Sales | $1,000,000 | $800,000 |
| Cost of Sales | $500,000 | $500,000 |
| Gross Profit | $500,000 | $300,000 |
| Gross Profit Margin | 50.0% | 37.5% |
| Net Profit Before Taxes | $55,000 | $65,000 |
| Net Profit Margin | 5.5% | 8.1% |
| Cash | $1,000 | $1,000 |
| Accounts Receivable | $10,000 | $40,000 |
| Current Assets | $35,000 | $60,000 |
| Gross Fixed Assets | $100,000 | $50,000 |
| Current Liabilities | $25,000 | $35,000 |
| Total Liabilities (Total Debt) | $75,000 | $89,000 |
| Employees | 100 | 90 |

SYSTEMS, METHODS AND COMPUTER PROGRAM PRODUCTS FOR PRODUCING NARRATIVE FINANCIAL ANALYSIS REPORTS

RELATED APPLICATIONS

This application claims the benefit of U.S. Provisional Application No. 60/163,502, filed Nov. 3, 1999.

FIELD OF THE INVENTION

The present invention relates generally to financial analysis and, more particularly, to systems, methods, and computer program products for performing financial analysis.

BACKGROUND OF THE INVENTION

Financial analysis involves the use of various financial formulas (ratios) to measure the financial strengths and weaknesses of a company and to compare these strengths and weaknesses with those of other companies within an industry. Financial analysis information may be valuable to those within a company (e.g., officers, and financial managers) and to those outside of a company (e.g., investors, creditors, and security analysts).

Financial ratios are designed to show relationships between various financial statement accounts. For example, Company A may have debt of $4,000,000 and interest charges of $700,000, while Company B may have debt of $64,000,000 and interest charges of $7,700,000. The actual burden of these debts, and the companies' ability to repay them, can be determined by comparing each company's debt to its assets, and the interest each company is charged to the income available for payment of interest. Such comparisons are made by a procedure known as "ratio analysis."

Various known categories of ratios include liquidity ratios, asset management ratios, debt management ratios, profitability ratios, and market value ratios. Liquidity ratios are designed to show the relationship of cash and other current assets to a company's current obligations. Asset management ratios are designed to measure how effectively a company is utilizing its assets. Debt management ratios are designed to measure the extent to which a company uses debt financing. Profitability ratios are designed to show the combined effects of liquidity, asset management, and debt management on operating results. Market value ratios are designed to relate the stock price of a company to the company's earnings and book value per share.

Ratio analysis may allow a financial manager to compare his or her company's financial performance with the financial performance of other companies in the same industry. In addition, trends in ratio analysis may allow a financial manager to analyze changes in a company's financial performance over time. Ratio analysis may give clues as to whether the financial situation of a company is improving or deteriorating. Financial analysis and, in particular, ratio analysis is discussed in detail in "Essentials of Managerial Finance", Weston et al., The Dryden Press, 1987, pp. 252–259, which is incorporated herein by reference.

Performing financial analysis and interpreting results from financial analysis may be a somewhat daunting task, especially to those untrained in managerial finance. For example, to some it may not be clear how to utilize ratio analysis in assessing the financial health of a company. Moreover, it may be difficult for some to compare the financial performance of their company to the financial performance of other companies.

Financial analysis services are available from various professional advisors, such as consultants and accountants. Unfortunately, these services may be expensive. As such, professional financial analysis services may be out of reach of smaller investors and business owners.

Various financial software products and services exist that can analyze one or more of the four basic financial statements (i.e., the income statement, balance sheet, statement of retained earnings, and statement of changes in financial position). For example, Entrepreneurial Edge Online (www.edgeonline.com) is a service of the Edward Lowe Foundation (P.O. Box 8, Cassopolis, Mich. 49031) that provides on-line forms in which users can enter data. Using the user-provided financial data, various ratios and financial statements can be generated. For example, a balance sheet can be generated and ratios such as liquidity, operating and solvency ratios can also be generated.

CPAnalyst financial software, available from the Illinois CPA Society (www.icpas.org) is configured to receive financial data from users and convert this data into various types of output, including financial statements, ratios, graphs and limited narrative reports. The narrative reports, however, consist of templates having fields within which financial data, including financial ratio values are inserted. The written description in each narrative report is identical for each output report.

In addition, existing financial analysis products and services may be somewhat limited in the depth of analysis that can be produced. Moreover, existing financial analysis products and services may not be able to indicate how a company is performing relative to the competition and how the company might improve performance.

SUMMARY OF THE INVENTION

In view of the above discussion, the present invention provides systems, methods, and computer program products for producing narrative financial analysis reports for business entities. According to embodiments of the present invention, a web server at an intermediary web site receives, from a client device, financial and/or other information about a business entity for one or more selected time periods. A set of financial values are calculated for the received financial information for each of the selected time periods. Each financial value in a set is calculated from a respective one of a plurality of financial formulas. Exemplary financial formulas may include, but are not limited to, liquidity ratios, asset management ratios, debt management ratios, profitability ratios, and market value ratios.

At least one of the financial values in each set is compared with one or more financial values associated with other business entities within a selected industry. A score is assigned to one or more of the financial values in each set. Each assigned score reflects an assessment of financial performance of the business entity relative to other business entities within the selected industry. In addition, assigned scores for multiple time periods may be compared with each other to assess changes in financial performance from one time period to another time period.

One or more portions of stored text that are associated with one or more combinations of assigned scores are then selected from a database. A document is built with the one or more portions of selected text to generate a narrative financial analysis report for the business entity. The generated narrative financial analysis report is then transmitted to a client device of a user via a computer network, such as the Internet.

The present invention is designed to allow users to quickly input various financial data and answer various questions within a user-friendly interface, and then receive a custom narrative financial analysis report. The present invention may enhance managerial decision making by taking financial data and converting the financial data into relevant and practical analysis and recommendations. Furthermore, the present invention may complement the advice and recommendations received from professional advisors.

BRIEF DESCRIPTION OF THE DRAWINGS

FIGS. 3A–3C illustrate exemplary HTML data entry forms for use in obtaining financial data from users in accordance with embodiments of the present invention.

FIGS. 4A–4K illustrate an exemplary narrative financial analysis report generated in accordance with embodiments of the present invention.

GLOSSARY

Figure 1:
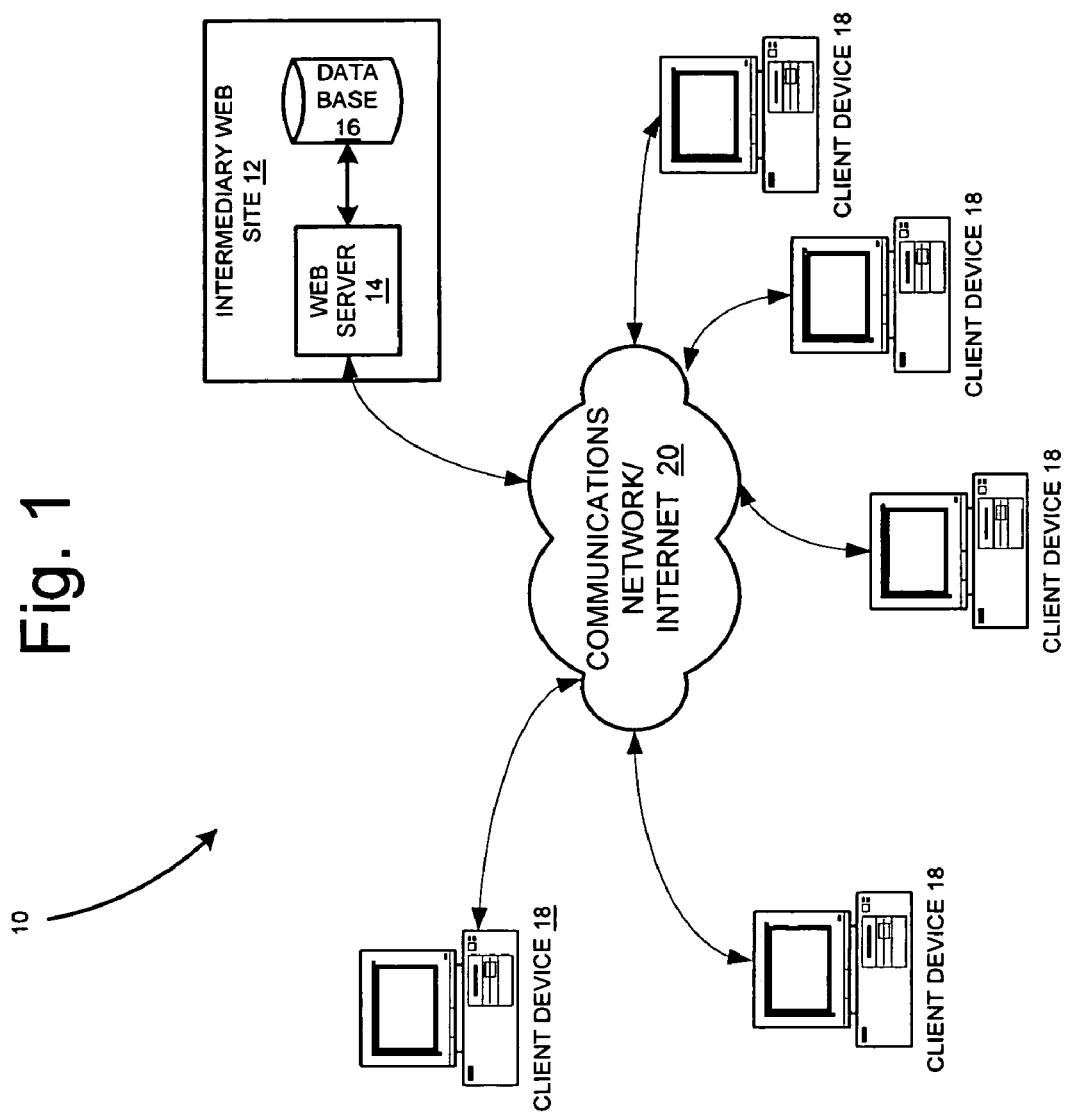
FIG. 1 is a block diagram that illustrates a system for producing narrative financial analysis reports for business entities, according to embodiments of the present invention.

Accounting: A method of gathering financial information and reporting on the activities of a business.

Accounts Payable: Amounts owed to suppliers.

Accounts Receivable: Amounts that customers owe for services rendered.

Assets: Resources that a company owns or holds such as buildings, machinery, and inventory. Assets are listed on the Balance Sheet.

Balance Sheet: A listing of a company's assets, liabilities, and equity as of a certain date.

Cash: The total funds available in financial (checking, savings, and marketable securities) accounts.

Cash Flow Forecast: A projection of how much money is expected to come in and go out of a company.

Cash Flow Statements: Reports of cash inflows and outflows for a particular period of time.

Cost of Sales (Cost of Goods Sold): The direct cost of products and services sold.

Current Assets: Assets held for a short period of time before they are put into a business, like cash, accounts receivable, inventory, marketable securities, and prepaid expenses.

Current Liabilities: Amounts owed to others which must be paid for in the short term-usually within a year. Accounts payable is a common current liability. Current liabilities are accrued expenses-built-up expenses.

Debt (liability): An obligation to pay money that is due under specified terms. Debt is an amount owed as of a certain date.

Equity (owner's equity, net worth, shareholders' equity): The recorded ownership claim of common and preferred shareholders in a corporation as reflected on the balance sheet. It's defined as total assets minus total liabilities.

Expenses: The costs of doing business measured over a certain period of time.

Fiscal Year: Twelve-month period during which a company reports income and expenses. Most companies use January 1 to December 31 for their fiscal year.

Fixed Costs: Any costs or expenses that don't vary too much with changes in the volume of operations over a specified time. Rent expense is usually a fixed expense.

General & Administrative Costs (G&A): Overhead costs like rent, utilities, staff personnel, professional fees, and depreciation.

Gross Fixed Assets: Any assets on a balance sheet considered to have a life or usefulness in excess of one year. Common examples include land, buildings, and machinery. Gross Fixed Assets do not include depreciation.

Gross Profit: The difference between Sales and Cost of Sales.

Gross Profit Margin: Gross Profit divided by Sales.

Income Statement: Shows sales, expenses, and profits or losses for a certain period of time. The income statement is also referred to as a profit/loss statement.

Inventory: The value of goods made or purchased for resale.

Net Profit Before Taxes: What is left over after all expenses are paid except income taxes.

Operating Expenses: Expenses which are paid from the gross profits of a company. They are often referred to as General & Administrative or Overhead Expenses.

Principal: The original amount of a loan. The rate of interest is based on the original amount of the loan.

Ratio Analysis: The use of a variety of ratios in analyzing the financial performance and condition of a company.

Sales: Revenues a company earns (sometimes referred to as gross sales) before expenses. Sales are measured by time.

Total Assets: The total amount of assets as of a certain date. Total assets equal current assets plus fixed assets. Fixed assets are long-term assets like buildings and machinery.

Total Employees+Full time Contractors: Full-time staff and full-time contractors; sometimes referred to as FTE (full time equivalents).

Total Liabilities (Total Debt): Amounts that are owed as of a certain date (i.e., expenses that have added up over time).

Variable Costs: Any costs or expenses that vary with changes in the volume of operations over a specified period. Inventory is a variable cost, also known as Cost of Goods Sold.

DETAILED DESCRIPTION OF THE INVENTION

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The Internet is a worldwide decentralized network of computers having the ability to communicate with each other. The Internet has gained broad recognition as a viable medium for communicating and for conducting business. The World-Wide Web (Web) was created in the early 1990's, and is comprised of server-hosting computers (web servers) connected to the Internet that have hypertext documents (referred to as web pages) stored therewithin. Web pages are accessible by client programs (e.g., web browsers) utilizing the Hypertext Transfer Protocol (HTTP) via a Transmission Control Protocol/Internet Protocol (TCP/IP) connection between a client-hosting device and a server-hosting device. While HTTP and web pages are the prevalent forms for the Web, the Web itself refers to a wide range of protocols including Secure Hypertext Transfer Protocol (HTTPS), File Transfer Protocol (FTP), and Gopher, and web content formats including plain text, HyperText Markup Language (HTML), Extensible Markup Language (XML), as well as image formats such as Graphics Interchange Format (GIF) and Joint Photographic Experts Group (JPEG).

A web site is conventionally a related collection of web files that includes a beginning file called a "home" page. From the home page, a visitor can access other files and applications at a web site. A large web site may utilize a number of servers, which may or may not be different and which may or may not be geographically-dispersed. For example, the web site of the International Business Machines Corporation (www.ibm.com) consists of thousands of web pages and files spread out over multiple web servers in locations world-wide.

A web server (also referred to as an HTTP server) is a computer program that utilizes HTTP to serve files that form web pages to requesting web clients. Exemplary web servers include International Business Machines Corporation's family of Lotus Domino® servers, the Apache server (available from www.apache.org), and Microsoft's Internet Information Server (IIS), available from Microsoft Corporation, Redmond, Wash. A web client is a requesting program that also utilizes HTTP. A browser is an exemplary web client for use in requesting web pages and files from web servers. A web server waits for a web client, such as a browser, to open a connection and to request a specific web page or application. The web server then sends a copy of the requested item to the web client, closes the connection with the web client, and waits for the next connection.

HTTP allows a browser to request a specific item, which a web server then returns and the browser renders within a display screen. To ensure that browsers and web servers can interoperate unambiguously, HTTP defines the exact format of requests (HTTP requests) sent from a browser to a web server as well as the format of responses (HTTP responses) that a web server returns to a browser. Exemplary browsers that can be utilized by users accessing an intermediary web site according to the present invention include, but are not limited to, Netscape Navigator® (America Online, Inc., Dulles, Va.) and Internet Explorer™ (Microsoft Corporation, Redmond, Wash.). Browsers typically provide a graphical user interface for retrieving and viewing web pages, applications, and other resources served by web servers.

As is known to those skilled in this art, a web page is conventionally formatted via a standard page description language such as HTML, which typically contains text and can reference graphics, sound, animation, and video data. HTML provides for basic document formatting and allows a web content provider to specify anchors or hypertext links (typically manifested as highlighted text) to other servers. When a user selects (i.e., activates) a particular hypertext link, a browser running on the user's client device reads and interprets an address, called a Uniform Resource Locator (URL) associated with the hypertext link, connects the browser with a web server at that address, and makes a request (e.g., an HTTP request) for the file identified in the hypertext link. The web server then sends the requested file to the client device which the browser interprets and renders within a display screen.

As will be appreciated by one of skill in the art, the present invention may be embodied as methods, data processing systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code for carrying out operations of the present invention may be written in an object oriented programming language such as JAVA@, Smalltalk or C++. The computer program code for carrying out operations of the present invention may also be written in conventional procedural programming languages, such as "C", JavaScript, Visual Basic, TSQL, Perl, or in various other programming languages. Software embodiments of the present invention do not depend on implementation with a particular programming language. Portions of the program code may execute entirely on one or more data processing systems utilized by a web site.

Program code for carrying out aspects of the present invention may execute entirely on one or more servers, or it may execute partly on a server and partly on a client within a client device (i.e., a user's web client), or as a proxy server at an intermediate point in a communications network. In the latter scenario, a client device may be connected to a server through a LAN or a WAN (e.g., an intranet), or the connection may be made through the Internet (e.g., via an Internet Service Provider). The communication protocols are defined at the application level, and they are intended to be implemented over the TCP/IP Internet Protocol Suite. However, the present invention is not TCP/IP-specific, and therefore it may be embodied using a protocol suite that is functionally equivalent to TCP/IP.

The present invention is described below with reference to block diagram and/or flowchart illustrations of methods, apparatus (systems) and computer program products according to an embodiment of the invention. It is understood that each block of the block diagram and/or flowchart illustrations, and combinations of blocks in the block diagram and/or flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the block diagram and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block diagram and/or flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block diagram and/or flowchart block or blocks.

Referring now to FIG. 1, a system 10 for producing a narrative financial analysis report for a business entity, according to an embodiment of the present invention, is illustrated. The system 10 includes a web site 12 of an intermediary that is configured to receive financial information from users and to generate narrative financial analysis reports based on the received financial information. The illustrated intermediary web site 12 includes a web server 14 and a database 16. Although a single web server 14 and a single database 16 are illustrated, it is understood that multiple web servers and multiple databases may be utilized to perform the various functions of the intermediary web site 12. Moreover, the functionality of the web server 14 and/or the database 16 may be integrated together.

The web server 14 is the "front end" component of the intermediary web site 12 and is configured to handle various client requests from users accessing the intermediary web site 12. Exemplary web servers that may be utilized as a web server 12 in the illustrated system 10 include, but are not limited to, Apache, available from the Apache Server Project, http://www.apache.org; Microsoft's Internet Information Server (IIS), available from Microsoft Corporation, Redmond, Wash.; and Netscape's FastTrack® and Enterprise™ servers, available from America Online, Inc., Dulles, Va. Other web servers that may be utilized include Novell's web Server for users of its NetWare® operating system, available from Novell, Inc., San Jose, Calif.; and IBM's family of Lotus Domino® servers, available from International Business Machines Corporation, Armonk, N.Y.

As is known by those of skill in the art, a database is a collection of data that is organized in "tables." A database typically includes a database manager that facilitates accessing, managing, and updating data within the various tables of a database. Exemplary types of databases that can be utilized to perform the various functions of the illustrated database 16, according to the present invention, include relational databases, distributed databases (databases that are dispersed or replicated among different points in a network), and object-oriented databases. Relational, distributed, and object-oriented databases are well understood by those of skill in the art and need not be discussed further herein. Exemplary databases that can be utilized to perform the various functions of the illustrated database 16 include, but are not limited to, IBM's DB2® database, Microsoft's SQL server database, and database products from Oracle, Sybase, and Computer Associates.

A database server (not illustrated) may be utilized to serve as a "middleman" server between the web server 12 and the database 16. As is known to those of skill in the art, a database server includes program code and logic for retrieving data from databases (and from sources external to a web site) in response to requests from a web server. Exemplary database servers that may be utilized as a database server in the illustrated system 10 include, but are not limited to, Microsoft's SQL server, IBM DB2® Universal Database server, and the WebSphere™ Net.Commerce server, the latter two being available from International Business Machines Corporation, Armonk, N.Y.

The illustrated intermediary web site 12 is configured to communicate with users accessing the intermediary web site 12 via a client program, such as a browser, running on a client device 18, such as a personal computer. However, it is understood that electronic devices including, but not limited to, wireless communications devices, personal digital assistants (PDAs), hand-held computers, Internet-ready phones, and WebTVs, may be utilized as client devices 18 for communication with the web server 14 of the intermediary web site 12 in accordance with the present invention. A browser running on each client device 18 communicates with the web server 14 of the intermediary web site 12 via a communications network 20, such as the Internet.

According to an embodiment of the present invention, the web server 14 includes one or more applications configured to retrieve financial data from a user, to analyze and manipulate the financial data, to retrieve portions of text from the database 16, to generate a narrative financial analysis report with the retrieved text portions, and to serve the generated narrative financial analysis report to a user. An exemplary application for performing these functions is a Common Gateway Interface (CGI) application. As is understood by those of skill in the art, CGI is a standard that allows clients to interface with various applications via web servers. A web server processes a client CGI request using a CGI script or application. For example, when a database is queried by a client, a web server acts as a gateway between the database and the client. The web server transmits the client request to a CGI application that performs the database query, formats the results and returns HTML-formatted data to the web server. The web server then transmits the HTML-formatted data to the client for display to the user.

It is understood that the present invention is not limited to the use of CGI applications. For example, Microsoft Active Server Pages (ASP) technology and Java Server Pages (JSP) technology may be utilized to retrieve and transmit information from and to a client device in accordance with embodiments of the present invention.

It is also understood that the present invention may be implemented using a standalone workstation, personal computer, and/or mainframe computer. The present invention may be implemented via an intranet or other private network, as well.

Figure 2:
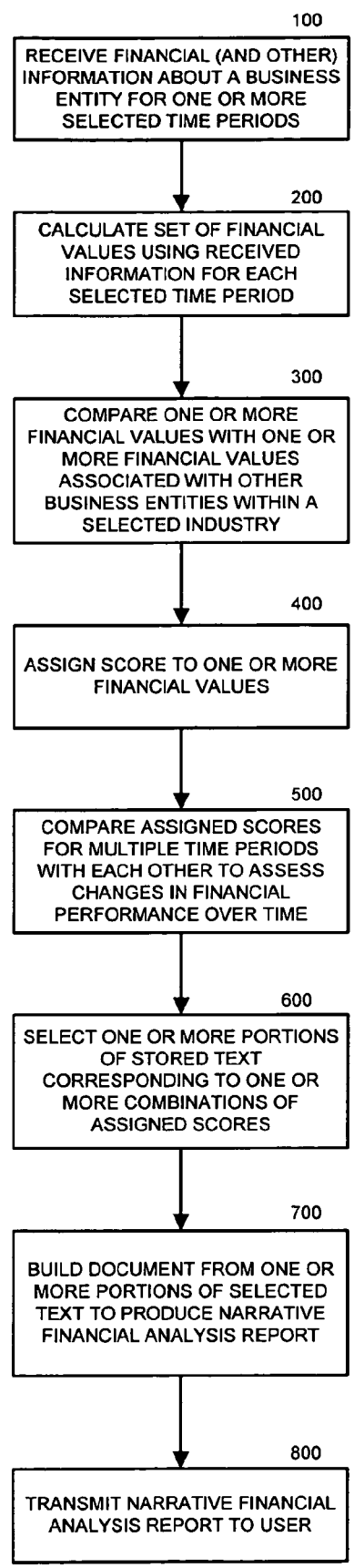
FIG. 2 is a flow chart illustrating operations for producing narrative financial analysis reports for business entities, according to embodiments of the present invention.

Referring now to FIG. 2 operations for producing narrative financial analysis reports for business entities according to embodiments of the present invention are illustrated. Initially, a web server 14 at an intermediary web site 12 receives, from a client device, financial and/or other information about a business entity for one or more selected time periods (Block 100). A set of financial values are calculated for the received financial information for each of the selected time periods (Block 200). As will be described in detail below, each financial value in a set is calculated from a respective one of a plurality of financial formulas. Exemplary financial formulas may include, but are not limited to, liquidity ratios, asset management ratios, debt management ratios, profitability ratios, and market value ratios.

At least one of the financial values in each set is compared with one or more financial values associated with other business entities within a selected industry (Block 300). A score is assigned to one or more of the financial values in each set (Block 400). As described in detail below, each assigned score reflects an assessment of financial performance of the business entity relative to other business entities within the selected industry. For example, "Current Ratio" may be assigned a score of "strong", "good", "average" or "poor".

In addition, assigned scores for multiple time periods may be compared with each other to assess changes in financial performance from one time period to another time period (Block 500). For example, "Gross Profit Margin" for a selected time period may be assigned a score of "rise", "same", and "down" relative to "Gross Profit Margin" for another selected time period.

One or more portions of stored text that are associated with one or more combinations of assigned scores are then selected from a database (Block 600). For example, scores for financial values generated from formulas related to "Income" are combined to produce an alphanumeric string. Exemplary financial formulas related to "Income" may include, for example, "Net Income Margin", "Net Income Margin Movement", "Net Income Movement", "Gross Profit Margin", "Gross Profit", and "Sales Percentage Change". An identifier for each formula, along with a respective score for each formula, can be concatenated to produce an alphanumeric string. An exemplary alphanumeric string is represented by "I-05g-06r-07s-08r-09r-10s", wherein "I" designates a set of formulas related to "Income"; wherein 05, 06, 07, 08, 09, and 10 identify respective formulas in the set of formulas related to "Income"; and wherein "g", "r", and "f" identify scores of "good", "rise", and "significant rise".

The one or more portions of selected text are then utilized to build a narrative financial analysis report for the business entity (Block 700). The generated narrative financial analysis report is then transmitted to a client device of a user via a computer network, such as the Internet (Block 800).

Figure 3A:
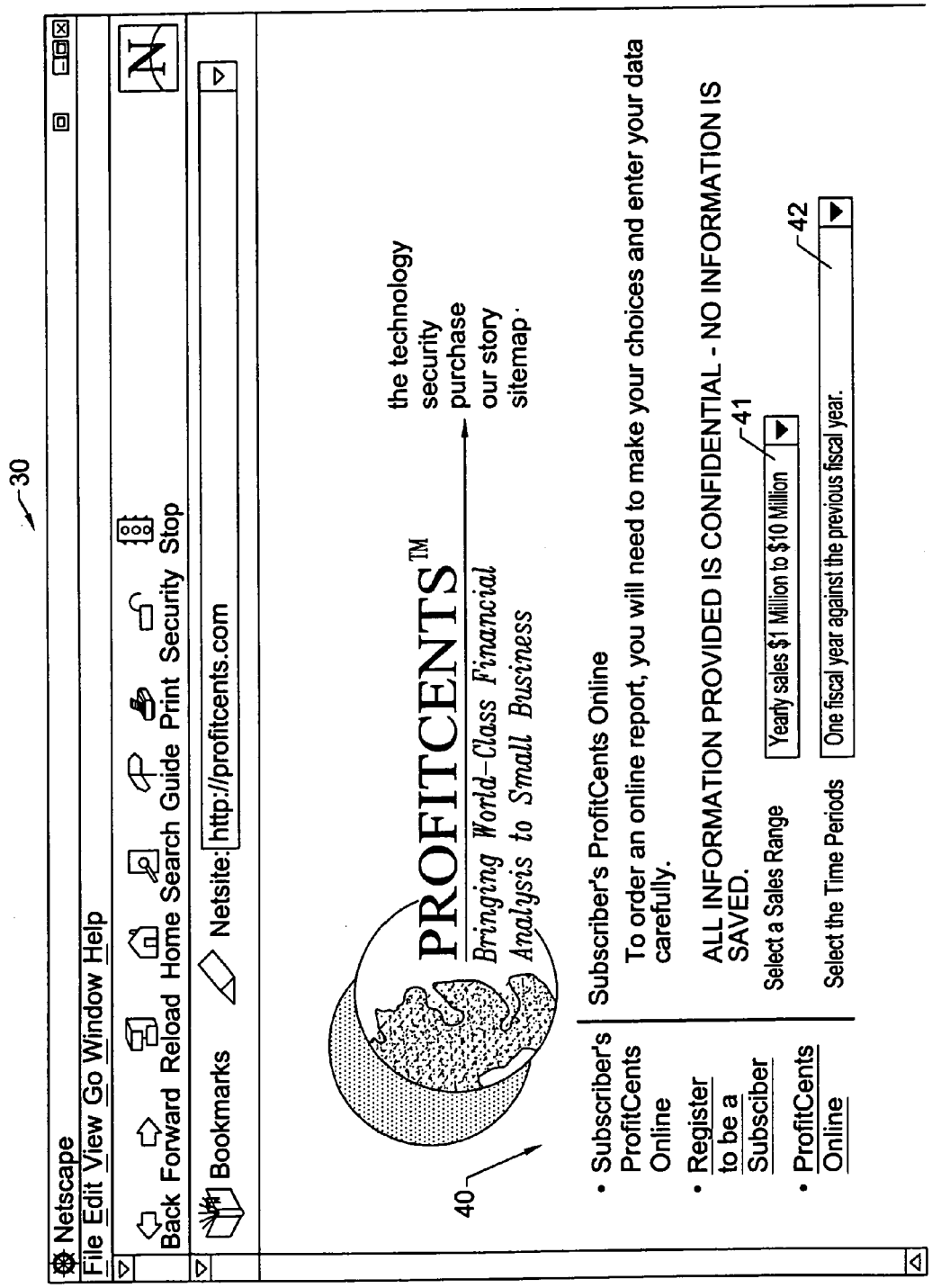
Figure 4B:
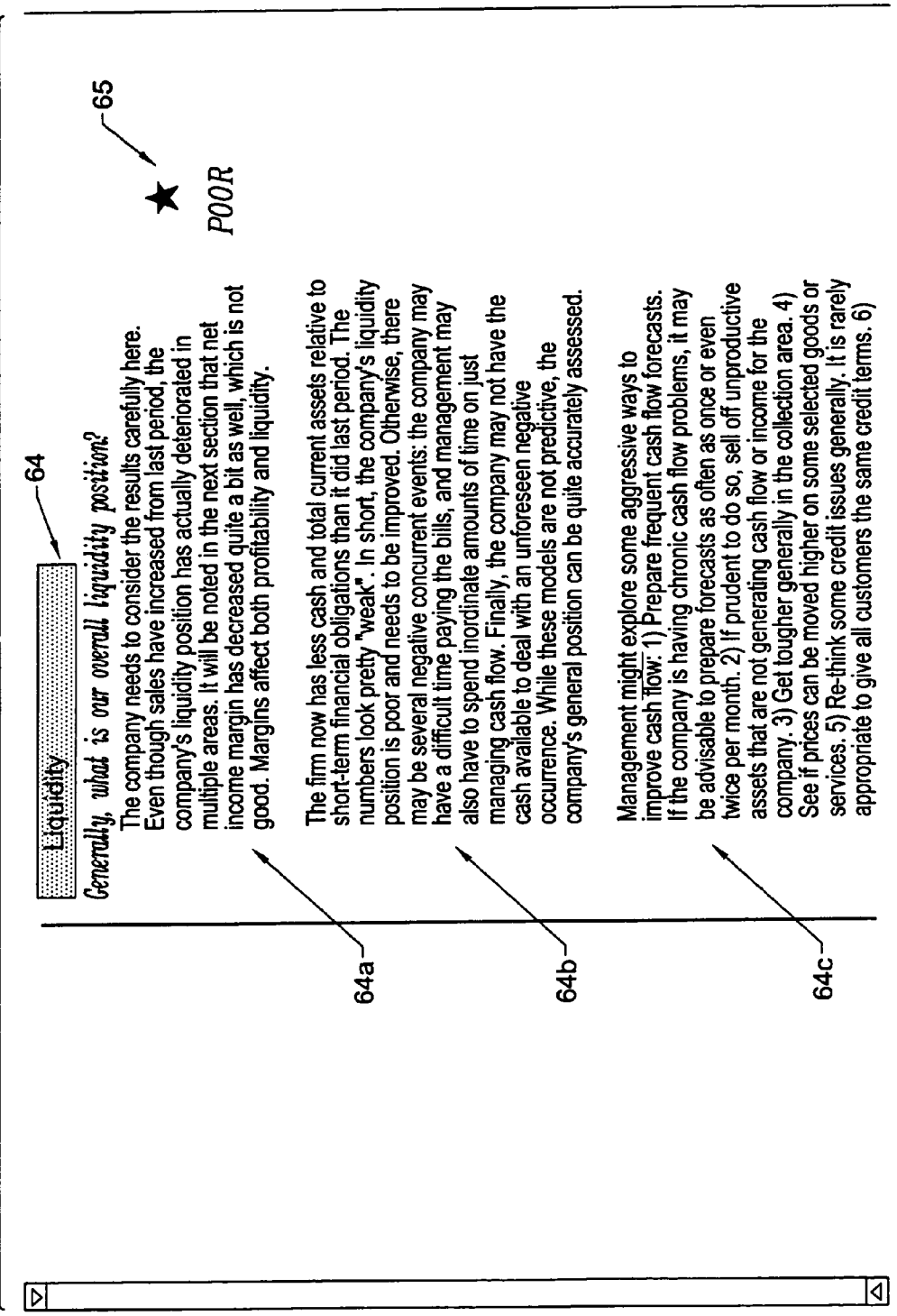
Figure 4I:
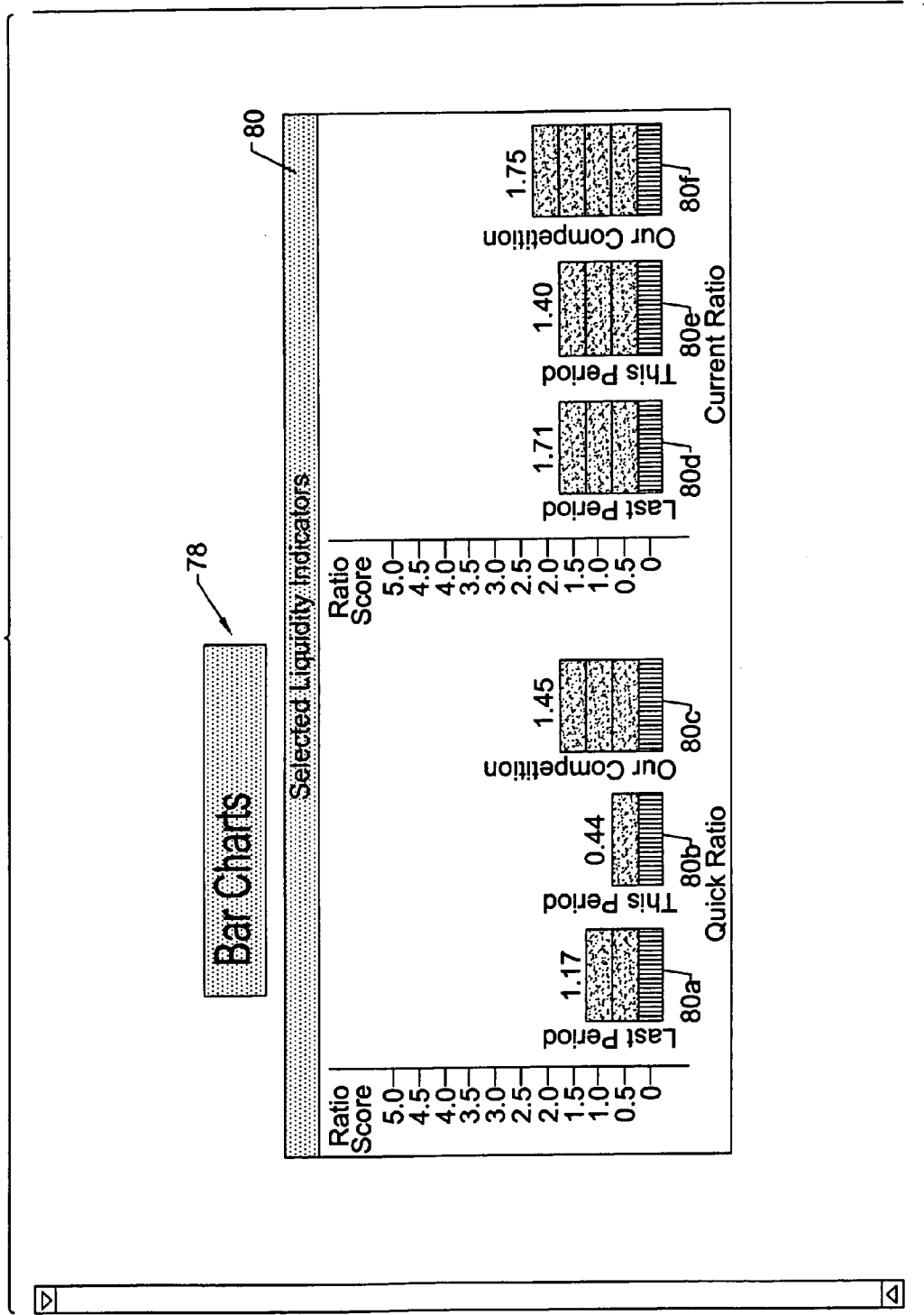
Figure 4J:
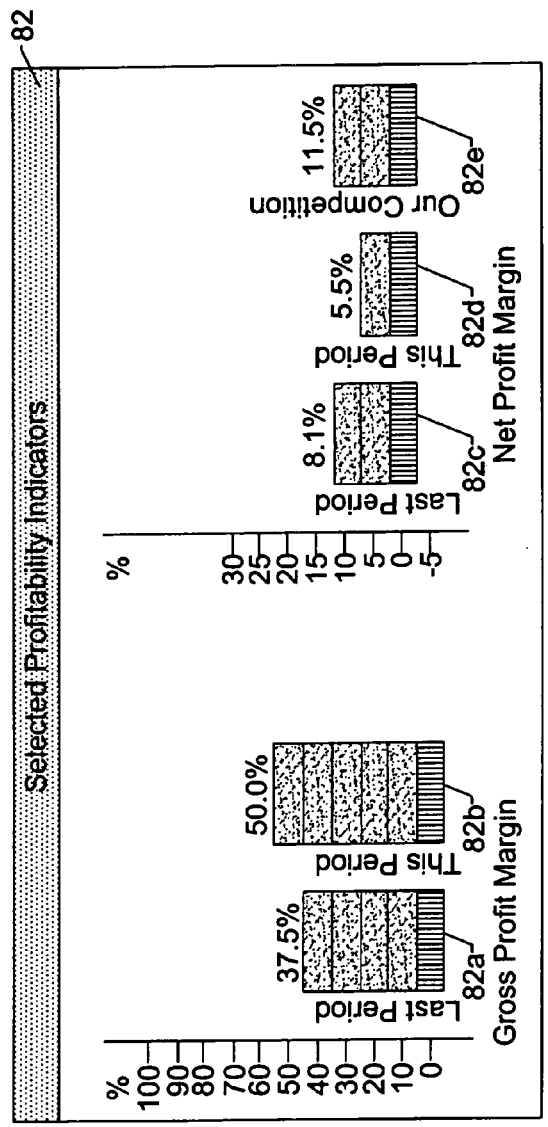
Figure 4K:
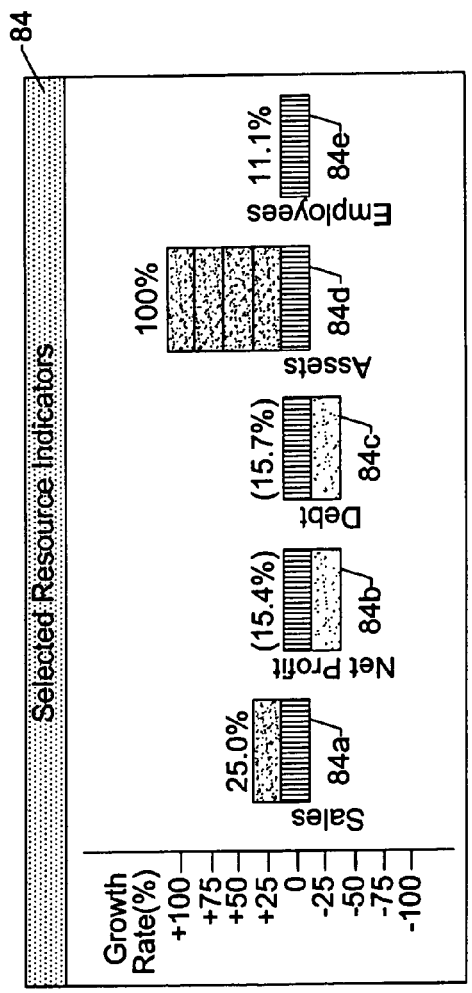

Referring now to FIGS. 3A–3C, an exemplary HTML data entry form 40 for obtaining financial information from a user about a business entity for selected time periods is illustrated. The illustrated form 40 is served from the web server 14 of the intermediary web site 12 and is displayed within a user's client (e.g., browser) 30. HTML forms are well known to those of skill in the art and will not be described further herein. Moreover, it is understood that various types and styles of data entry forms may be utilized in accordance with the present invention and that the present invention is not limited to the illustrated data entry forms set forth herein.

Using the displayed HTML form 40, a user selects a sales range via pull-down menu field 41 and the user selects two time periods via pull-down menu field 42. Exemplary sales ranges may include, but are not limited to, "Yearly sales under $1 Million", "Yearly sales $1 Million to $10 Million", and "Yearly sales over $10 Million". Exemplary time periods are listed below in Table 1.

TABLE 1

| Time Period | Example |
| --- | --- |
| One month against the month that preceded it. | Comparing the financial results of March, 1999, to February, 1999. |
| One quarter against the quarter that directly preceded it. | Comparing the first quarter of 1999 to the last quarter of 1998. |
| One fiscal year against the previous fiscal year. | Comparing 1998 financial data to 1997 financial data. |
| A month from this year against the same month from last year. | Comparing March, 1998, financial results to March, 1997 financial results. |
| A quarter from this year against the same quarter from last year. | Comparing the first quarter of 1999 (January 1–March 31) to the first quarter of 1998. |

In the illustrated HTML form 40, a user has selected a sales range of "Yearly sales $1 Million to $10 Million" in field 41 and time periods of "One fiscal year against the previous fiscal year" in field 42.

Next, a user enters various financial data within fields 43a–43j and 44a–44j for each of the selected time periods, respectively. For example, fields 43a–43j relate to the current selected time period, and fields 44a–44j relate to the previous selected time period. In the illustrated HTML form 40, a user enters the following financial data within respective fields for the two selected time periods: Cost of Sales 43a, 44a; Net Profit Before Taxes 43b, 44b; Cash 43c, 44c; Accounts Receivable 43d, 44d; Current Assets 43e, 44e; Gross Fixed Assets 43f, 44f; Current Liabilities 43g, 44g; Total Liabilities 43h, 44h; and Total Employees+Full Time Contractors 43j, 44j.

Using pull-down menu field 45, a user selects a description of the industry for his/her business. An exemplary listing of industry/business descriptions for display within pull down menu field 45 is provided below in Table 2. It is understood that Table 2 is provided for illustration only and is not intended to be all inclusive.

TABLE 2

COMPUTER AND TECHNOLOGY SERVICES

Computer Service Business
A computer service business; sells technical services and uses parts/components to service clients.
Computer Software Developer
Develops and then sells computer software.
Manufacture Computers
Makes computer hardware/components and basically provides service only for the products sold.
Retail Computers
Sells computers and software on a retail basis.
Wholesale Computers
Sells computer hardware/components and provides a lot of services and/or support.

RETAIL BUSINESSES

Convenience Store
A convenience store.
Grocery Store
A grocery store.
Retail Jewelry Store
A retail jewelry store.
Standard Retail Business
A standard retail business; buys products at wholesale and sells them at retail.

PRODUCT BASED BUSINESSES

Biotech Company
A biotechnology company.

SERVICE FIRMS

Auto Repair
Fixes cars when they break and also sells parts.
Construction Company
a construction company. Builds residential or commercial buildings, or other structures.
Contract Research Organization
Provides Contract Research Organization (CRO) Services. Products are reports and studies.
Contractor
A contractor - installs materials using supplies and people. (Rugs, carpentry, roofs, etc.)
Day Care Center
A day care center; employees care for children.
Doctor's Office
Doctor's office or a medical facility.
Employment Agency
Places people; an employment agency.
Equipment Rental
Rents equipment and supplies.
Fast Food Restaurant
A fast food restaurant; has counter staff, not wait staff.
Health Club
A health club, a place where people can work out.
Hotel/Motel
A hotel/motel business.
Insurance Agency
Sells insurance products.

TABLE 2-continued

Law Firm
Provides legal services.
PR Firm
A public relations firm.
Printer
A printer; does professional printing or copying.

Using field 46, a user assigns a name for the narrative financial analysis report to be generated in accordance with the present invention. In the illustrated embodiment, a user has indicated that his/her business is a Contract Research Organization (CRO) and that the name of the narrative financial analysis report to be generated is "Typical CRO Business".

Referring now to FIG. 3B, a user provides additional information via radio buttons 47. In particular, using radio buttons 47*a*, a user identifies the accounting method used by his/her business. Using radio buttons 47*b*, a user identifies how long it takes to receive payment from a customer. Using radio buttons 47*c*, a user identifies how long his/her business takes to pay a vendor/supplier. Using radio buttons 47*d*, a user identifies how long he/she has been in business. Using radio buttons 47*e*, a user identifies the accuracy of the financial statements for the business. Using radio buttons 47*f*, a user identifies a factor that best levers profits in the business.

Once the above-described information is entered into the various fields of FIGS. 3A–3B, a user can initiate processing of a narrative financial analysis report according to the present invention by activating the "Process My Report" button 48.

In response to activation of the "Process My Report" button 48, a set of financial values are calculated for each selected time period using various financial formulas (ratios). Table 3 below lists an exemplary set of financial formulas for use in accordance with the present invention. It is understood, however, that Table 3 is not intended to be all inclusive.

TABLE 3

| Formula Number | Formula Name | Calculation |
|---|---|---|
| 1 | Current Ratio | Current Assets/Current Liabilities |
| 2 | Current Ratio Change | (Current Ratio first period less Current Ratio second period)/Current Ratio first period |
| 3 | Quick Ratio | Cash plus Accounts Receivable/Current Liabilities |
| 4 | Quick Ratio Change | (Quick Ratio first period less Quick Ratio second period)/Quick Ratio first period |
| 5 | Net Income Margin | Net income before Taxes/Sales |
| 6 | Net Income Margin Change | (Net Margin first period less Net Margin second period)/Net Margin first period |
| 7 | Net Income Movement | (Net Income first period less Net Income second period)/Net Income first period |
| 8 | Gross Profit Margin Change | (Gross Profit Margin first period less Gross Profit Margin second period)/Gross Margin first period |
| 9 | Gross Profit Change | (Gross Profit first period less Gross Profit second period)/Gross Profit first period |
| 10 | Sales Change | (Sales first Period less Sales second period)/Sales first period |
| 11 | Debt Use | Percentage Change in Debt between periods/Percentage Change in Profits between periods |
| 12 | Debt Change | (Total Debt first period less Total Debt second period)/Total Debt first period |
| 13 | Use of Assets | (Percentage Change in Assets between periods)/Percentage Change in Profits between periods |
| 14 | Assets Change | (Total Assets first period less Total Assets second period)/Total Assets first period |
| 15 | Use of Employees | Percentage Change in Employees between periods/Percentage Change in Profits between periods |
| 16 | Employees Change | (Total Employees first period less Total Employees second period)/Total Employees first period |

A score is then assigned to each financial value in each set. Exemplary scores used in accordance with the present invention include, but are not limited to, "Strong", "Good", "Average", "Poor", Significant Rise", "Rise", "Same", and "Down". Tables 4–16 illustrate scoring ranges for various ones of the formulas listed in Table 3 above. Each score is assigned according to Sales Range and Selected Time Periods, as illustrated.

TABLE 4

| Current Ratio | Strong | Good | Average | Poor |
|---|---|---|---|---|
| Sales Under $1,000,000 | | | | |
| Monthly | >2.0 | 1.8–2.0 | 1.6–1.8 | <1.6 |
| Quarterly | >2.0 | 1.8–2.0 | 1.6–1.8 | <1.6 |
| Yearly | >2.0 | 1.8–2.0 | 1.6–1.8 | <1.6 |
| Month against last year's month | >2.0 | 1.8–2.0 | 1.6–1.8 | <1.6 |
| Quarter against last year's quarter | >2.0 | 1.8–2.0 | 1.6–1.8 | <1.6 |
| Sales $1 MM–$3 MM | | | | |
| Monthly | >2.5 | 2.5–2 | 1.7–2 | <1.7 |
| Quarterly | >2.5 | 2.5–2 | 1.7–2 | <1.7 |
| Yearly | >2.5 | 2.5–2 | 1.7–2 | <1.7 |
| Month against last year's month | >2.5 | 2.5–2 | 1.7–2 | <1.7 |
| Quarter against last year's quarter | >2.5 | 2.5–2 | 1.7–2 | <1.7 |
| Sales > $3 MM | | | | |
| Monthly | >2.5 | 2.5–2 | 1.7–2 | <1.7 |
| Quarterly | >2.5 | 2.5–2 | 1.7–2 | <1.7 |
| Yearly | >2.5 | 2.5–2 | 1.7–2 | <1.7 |
| Month against last year's month | >2.5 | 2.5–2 | 1.7–2 | <1.7 |
| Quarter against last year's quarter | >2.5 | 2.5–2 | 1.7–2 | <1.7 |

TABLE 5

| Current Ratio | Rise | Same | Down |
|---|---|---|---|
| Sales Under $1,000,000 | | | |
| Monthly | >6% | 6%—-6% | <-6% |
| Quarterly | >6% | 6%—-6% | <-6% |
| Yearly | >12% | 12%—-12% | <-12% |
| Month against last year's month | >12% | 12%—-12% | <-12% |
| Quarter against last year's quarter | >12% | 12%—-12% | <-12% |
| Sales $1 MM–$3 MM | | | |
| Monthly | >6% | 6%—-6% | <-6% |
| Quarterly | >6% | 6%—-6% | <-6% |
| Yearly | >12% | 12%—-12% | <-12% |
| Month against last year's month | >12% | 12%—-12% | <-12% |
| Quarter against last year's quarter | >12% | 12%—-12% | <-12% |
| Sales > $3 MM | | | |
| Monthly | >6% | 6%—-6% | <-6% |
| Quarterly | >6% | 6%—-6% | <-6% |
| Yearly | >12% | 12%—-12% | <-12% |

TABLE 5-continued

| Current Ratio | Rise | Same | Down |
|---|---|---|---|
| Month against last year's month | >12% | 12%—12% | <−12% |
| Quarter against last year's quarter | >12% | 12%—12% | <−12% |

TABLE 6

| Quick Ratio | Good | Average | Poor |
|---|---|---|---|
| Sales Under $1 MM | | | |
| Monthly | >1.1 | 1.1–.8 | <.8 |
| Quarterly | >1.1 | 1.1–.8 | <.8 |
| Yearly | >1.1 | 1.1–.8 | <.8 |
| Month against last year's month | >1.1 | 1.1–.8 | <.8 |
| Quarter against last year's quarter | >1.1 | 1.1–.8 | <.8 |
| Sales $1 MM–$3 MM | | | |
| Monthly | >1.1 | 1.1–.8 | <.8 |
| Quarterly | >1.1 | 1.1–.8 | <.8 |
| Yearly | >1.1 | 1.1–.8 | <.8 |
| Month against last year's month | >1.1 | 1.1–.8 | <.8 |
| Quarter against last year's quarter | >1.1 | 1.1–.8 | <.8 |
| Sales > $3 MM | | | |
| Monthly | >1.1 | 1.1–.8 | <.8 |
| Quarterly | >1.1 | 1.1–.8 | <.8 |
| Yearly | >1.1 | 1.1–.8 | <.8 |
| Month against last year's month | >1.1 | 1.1–.8 | <.8 |
| Quarter against last year's quarter | >1.1 | 1.1–.8 | <.8 |

TABLE 7

| Quick Ratio | Rise | Same | Down |
|---|---|---|---|
| Sales Under $1 MM | | | |
| Monthly | >6% | 6%—6% | <−6% |
| Quarterly | >6% | 6%—6% | <−6% |
| Yearly | >12% | 12%—12% | <−12% |
| Month against last year's month | >12% | 12%—12% | <−12% |
| Quarter against last year's quarter | >12% | 12%—12% | <−12% |
| Sales $1 MM–$3 MM | | | |
| Monthly | >6% | 6%—6% | <−6% |
| Quarterly | >6% | 6%—6% | <−6% |
| Yearly | >12% | 12%—12% | <−12% |
| Month against last year's month | >12% | 12%—12% | <−12% |
| Quarter against last year's quarter | >12% | 12%—12% | <−12% |
| Sales > $3 MM | | | |
| Monthly | >6% | 6%—6% | <−6% |
| Quarterly | >6% | 6%—6% | <−6% |
| Yearly | >12% | 12%—12% | <−12% |
| Month against last year's month | >12% | 12%—12% | <−12% |
| Quarter against last year's quarter | >12% | 12%—12% | <−12% |

TABLE 8

| Income Margin | Good | Average | Poor |
|---|---|---|---|
| Sales Under $1 MM | | | |
| Monthly | >4% | 1%–4% | <1% |
| Quarterly | >4% | 1%–4% | <1% |
| Yearly | >4% | 1%–4% | <1% |
| Month against last year's month | >4% | 1%–4% | <1% |
| Quarter against last year's quarter | >4% | 1%–4% | <1% |
| Sales $1 MM–$3 MM | | | |
| Monthly | >4% | 1%–4% | <1% |
| Quarterly | >4% | 1%–4% | <1% |

TABLE 8-continued

| Income Margin | Good | Average | Poor |
|---|---|---|---|
| Yearly | >4% | 1%–4% | <1% |
| Month against last year's month | >4% | 1%–4% | <1% |
| Quarter against last year's quarter | >4% | 1%–4% | <1% |
| Sales > $3 MM | | | |
| Monthly | >4% | 4%–1% | <1% |
| Quarterly | >4% | 4%–1% | <1% |
| Yearly | >4% | 4%–1% | <1% |
| Month against last year's month | >4% | 4%–1% | <1% |
| Quarter against last year's quarter | >4% | 4%–1% | <1% |

TABLE 9

| Income Margin | Rise | Same | Down |
|---|---|---|---|
| Sales Under $1 MM | | | |
| Monthly | >6% | 6%—6% | <−6% |
| Quarterly | >6% | 6%—6% | <−6% |
| Yearly | >6% | 6%—6% | <−6% |
| Month against last year's month | >6% | 6%—6% | <−6% |
| Quarter against last year's quarter | >6% | 6%—6% | <−6% |
| Sales $1 MM–$3 MM | | | |
| Monthly | >6% | 6%—6% | <−6% |
| Quarterly | >6% | 6%—6% | <−6% |
| Yearly | >6% | 6%—6% | <−6% |
| Month against last year's month | >6% | 6%—6% | <−6% |
| Quarter against last year's quarter | >6% | 6%—6% | <−6% |
| Sales > $3 MM | | | |
| Monthly | >6% | 6%—6% | <−6% |
| Quarterly | >6% | 6%—6% | <−6% |
| Yearly | >6% | 6%—6% | <−6% |
| Month against last year's month | >6% | 6%—6% | <−6% |
| Quarter against last year's quarter | >6% | 6%—6% | <−6% |

TABLE 10

| Net Income | Sig. Rise | Rise | Same | Down |
|---|---|---|---|---|
| Sales Under $1 MM | | | | |
| Monthly | >20% | 20%–6% | 6%—6% | <−6% |
| Quarterly | >20% | 20%–6% | 6%—6% | <−6% |
| Yearly | >20% | 20%–6% | 6%—6% | <−6% |
| Month against last year's month | >20% | 20%–6% | 6%—6% | <−6% |
| Quarter against last year's quarter | >20% | 20%–6% | 6%—6% | <−6% |
| Sales $1 MM–$3 MM | | | | |
| Monthly | >20% | 20%–6% | 6%—6% | <−6% |
| Quarterly | >20% | 20%–6% | 6%—6% | <−6% |
| Yearly | >20% | 20%–6% | 6%—6% | <−6% |
| Month against last year's month | >20% | 20%–6% | 6%—6% | <−6% |
| Quarter against last year's quarter | >20% | 20%–6% | 6%—6% | <−6% |
| Sales > $3 MM | | | | |
| Monthly | >20% | 20%–6% | 6%—6% | <−6% |
| Quarterly | >20% | 20%–6% | 6%—6% | <−6% |
| Yearly | >20% | 20%–6% | 6%—6% | <−6% |
| Month against last year's month | >20% | 20%–6% | 6%—6% | <−6% |
| Quarter against last year's quarter | >20% | 20%–6% | 6%—6% | <−6% |

TABLE 11

| Gross Profit Margin | Rise | Same | Down |
|---|---|---|---|
| Sales Under $1 MM | | | |
| Monthly | >3% | 3%—-3% | <-3% |
| Quarterly | >3% | 3%—-3% | <-3% |
| Yearly | >3% | 3%—-3% | <-3% |
| Month against last year's month | >3% | 3%—-3% | <-3% |
| Quarter against last year's quarter | >3% | 3%—-3% | <-3% |
| Sales $1 MM–$3 MM | | | |
| Monthly | >3% | 3%—-3% | <-3% |
| Quarterly | >3% | 3%—-3% | <-3% |
| Yearly | >3% | 3%—-3% | <-3% |
| Month against last year's month | >3% | 3%—-3% | <-3% |
| Quarter against last year's quarter | >3% | 3%—-3% | <-3% |
| Sales > $3 MM | | | |
| Monthly | >3% | 3%—-3% | <-3% |
| Quarterly | >3% | 3%—-3% | <-3% |
| Yearly | >3% | 3%—-3% | <-3% |
| Month against last year's month | >3% | 3%—-3% | <-3% |
| Quarter against last year's quarter | >3% | 3%—-3% | <-3% |

TABLE 12

| Gross Profit | Rise | Same | Down |
|---|---|---|---|
| Sales Under $1 MM | | | |
| Monthly | >3% | 3%—-3% | <-3% |
| Quarterly | >3% | 3%—-3% | <-3% |
| Yearly | >3% | 3%—-3% | <-3% |
| Month against last year's month | >3% | 3%—-3% | <-3% |
| Quarter against last year's quarter | >3% | 3%—-3% | <-3% |
| Sales $1 MM–$3 MM | | | |
| Monthly | >3% | 3%—-3% | <-3% |
| Quarterly | >3% | 3%—-3% | <-3% |
| Yearly | >3% | 3%—-3% | <-3% |
| Month against last year's month | >3% | 3%—-3% | <-3% |
| Quarter against last year's quarter | >3% | 3%—-3% | <-3% |
| Sales > $3 MM | | | |
| Monthly | >3% | 3%—-3% | <-3% |
| Quarterly | >3% | 3%—-3% | <-3% |
| Yearly | >3% | 3%—-3% | <-3% |
| Month against last year's month | >3% | 3%—-3% | <-3% |
| Quarter against last year's quarter | >3% | 3%—-3% | <-3% |

TABLE 13

| Sales % Change | Sig. Rise | Rise | Same | Down |
|---|---|---|---|---|
| Sales Under $1 MM | | | | |
| Monthly | >20% | 20%–3% | 3%—-3% | <-3% |
| Quarterly | >20% | 20%–3% | 3%—-3% | <-3% |
| Yearly | >20% | 20%–3% | 3%—-3% | <-3% |
| Month against last year's month | >20% | 20%–3% | 3%—-3% | <-3% |
| Quarter against last year's quarter | >20% | 20%–3% | 3%—-3% | <-3% |

TABLE 14

| Assets | Sig. Rise | Rise | Same | Down |
|---|---|---|---|---|
| Sales Under $1 MM | | | | |
| Monthly | >20% | 20%–6% | 6%—-6% | <-6% |
| Quarterly | >20% | 20%–6% | 6%—-6% | <-6% |
| Yearly | >20% | 20%–6% | 6%—-6% | <-6% |
| Month against last year's month | >20% | 20%–6% | 6%—-6% | <-6% |
| Quarter against last year's quarter | >20% | 20%–6% | 6%—-6% | <-6% |
| Sales $1 MM–$3 MM | | | | |
| Monthly | >20% | 20%–6% | 6%—-6% | <-6% |
| Quarterly | >20% | 20%–6% | 6%—-6% | <-6% |
| Yearly | >20% | 20%–6% | 6%—-6% | <-6% |
| Month against last year's month | >20% | 20%–6% | 6%—-6% | <-6% |
| Quarter against last year's quarter | >20% | 20%–6% | 6%—-6% | <-6% |
| Sales > $3 MM | | | | |
| Monthly | >20% | 20%–6% | 6%—-6% | <-6% |
| Quarterly | >20% | 20%–6% | 6%—-6% | <-6% |
| Yearly | >20% | 20%–6% | 6%—-6% | <-6% |
| Month against last year's month | >20% | 20%–6% | 6%—-6% | <-6% |
| Quarter against last year's quarter | >20% | 20%–6% | 6%—-6% | <-6% |

TABLE 15

| Employees | Good | Average | Poor |
|---|---|---|---|
| Sales Under $1 MM | | | |
| Monthly | >1.0% | .8%–1.0% | <.8% |
| Quarterly | >1.0% | .8%–1.0% | <.8% |
| Yearly | >1.0% | .8%–1.0% | <.8% |
| Month against last year's month | >1.0% | .8%–1.0% | <.8% |
| Quarter against last year's quarter | >1.0% | .8%–1.0% | <.8% |
| Sales $1 MM–$3 MM | | | |
| Monthly | >1.0% | .8%–1.0% | <.8% |
| Quarterly | >1.0% | .8%–1.0% | <.8% |
| Yearly | >1.0% | .8%–1.0% | <.8% |
| Month against last year's month | >1.0% | .8%–1.0% | <.8% |
| Quarter against last year's quarter | >1.0% | .8%–1.0% | <.8% |
| Sales > $3 MM | | | |
| Monthly | >1.0% | .8%–1.0% | <.8% |
| Quarterly | >1.0% | .8%–1.0% | <.8% |
| Yearly | >1.0% | .8%–1.0% | <.8% |
| Month against last year's month | >1.0% | .8%–1.0% | <.8% |
| Quarter against last year's quarter | >1.0% | .8%–1.0% | <.8% |

TABLE 16

| Employee Use | Sig. Rise | Rise | Same | Down |
|---|---|---|---|---|
| Sales Under $1 MM | | | | |
| Monthly | >20% | 20%–6% | 6%—-6% | <-6% |
| Quarterly | >20% | 20%–6% | 6%—-6% | <-6% |
| Yearly | >20% | 20%–6% | 6%—-6% | <-6% |
| Month against last year's month | >20% | 20%–6% | 6%—-6% | <-6% |
| Quarter against last year's quarter | >20% | 20%–6% | 6%—-6% | <-6% |
| Sales $1 MM–$3 MM | | | | |
| Monthly | >20% | 20%–6% | 6%—-6% | <-6% |
| Quarterly | >20% | 20%–6% | 6%—-6% | <-6% |
| Yearly | >20% | 20%–6% | 6%—-6% | <-6% |

TABLE 16-continued

| Employee Use | Sig. Rise | Rise | Same | Down |
|---|---|---|---|---|
| Month against last year's month | >20% | 20%–6% | 6%—6% | <–6% |
| Quarter against last year's quarter | >20% | 20%–6% | 6%—6% | <–6% |
| Sales > $3 MM | | | | |
| Monthly | >20% | 20%–6% | 6%—6% | <–6% |
| Quarterly | >20% | 20%–6% | 6%—6% | <–6% |
| Yearly | >20% | 20%–6% | 6%—6% | <–6% |
| Month against last year's month | >20% | 20%–6% | 6%—6% | <–6% |
| Quarter against last year's quarter | >20% | 20%–6% | 6%—6% | <–6% |

Referring now to Tables 17–22, the possible scoring combinations for financial formulas associated with "Liquidity", "Income", "Assets", "Sales", "Borrowing", and "Employees" are listed, respectively.

TABLE 17

| LIQUIDITY: | Formula # | | | | |
|---|---|---|---|---|---|
| Current Ratio | 1 | Strong | Good | Average | Poor |
| Current Ratio Change | 2 | Rise | | Same | Down |
| Quick Ratio | 3 | Good | | Average | Poor |
| Quick Ratio Change | 4 | Rise | | Same | Down |
| Net Income Margin Change | 6 | Rise | | Same | Down |
| Net Income | 7 | Sig. Rise | Rise | Same | Down |
| Sales | 10 | Sig. Rise | Rise | Same | Down |

TABLE 18

| INCOME: | Formula # | | | | |
|---|---|---|---|---|---|
| Net Income Margin | 5 | Good | Average | | Poor |
| Net Income Margin Movement | 6 | Rise | Same | Down | |
| Net Income Movement | 7 | Sig. Rise | Rise | Same | Down |
| Gross Profit Margin | 8 | Rise | Same | Down | |
| Gross Profit | 9 | Rise | Same | Down | |
| Sales Percentage Change | 10 | Sig. Rise | Rise | Same | Down |

TABLE 19

| ASSETS: | Formula # | | | | |
|---|---|---|---|---|---|
| Use of Assets | 13 | Strong | Good | Average | Poor |
| Total Assets Change | 14 | Sig. Rise | Rise | Same | Down |
| Current Ratio Movement | 2 | Rise | | Same | Down |
| Net Income Margin Movement | 6 | Rise | | Same | Down |
| Net Income Movement | 7 | Sig. Rise | Rise | Same | Down |

TABLE 20

| SALES: | Formula # | | | | |
|---|---|---|---|---|---|
| Sales Percentage Change | 10 | Sig. Rise | Rise | Same | Down |
| Asset Movement | 14 | Sig. Rise | Rise | Same | Down |

TABLE 20-continued

| SALES: | Formula # | | | | |
|---|---|---|---|---|---|
| Employees Percentage Change | 16 | Sig. Rise | Rise | Same | Down |

TABLE 21

| BORROWING: | Formula # | | | | |
|---|---|---|---|---|---|
| Use of Debt | 11 | Good | Average | Poor | |
| Debt change | 12 | Sig. Rise | Rise | Same | Down |
| Current Ratio Movement | 2 | Rise | | Same | Down |
| Net Income Margin Movement | 6 | Rise | | Same | Down |
| Net Income Movement | 7 | Sig. Rise | Rise | Same | Down |

TABLE 22

| EMPLOYEES: | Formula # | | | | |
|---|---|---|---|---|---|
| Use of Employees | 15 | Good | Average | | Poor |
| Net Income Movement | 7 | Sig. Rise | Same | Down | |
| Employees Percentage Change | 16 | Sig. Rise | Rise | Same | Down |
| Asset Movement | 14 | Sig. Rise | Rise | Same | Down |

Referring now to Tables 23–25, the assigned scores for the financial formulas associated with "Liquidity", "Income", and "Assets" are listed, respectively. Although not illustrated, it is understood that financial formulas are also associated with "Sales", "Borrowing", and "Employees", in a similar manner. The illustrated combination of assigned scores for "Liquidity" is defined as the alphanumeric string "L-01s-02r-03g-04r-06r-07f-10f". The illustrated combination of assigned scores for "Income" is defined as the alphanumeric string "I-05g-06r-07s-08r-09r-10s". Similarly, the illustrated combination of assigned scores for "Assets" is defined as the alphanumeric string "A-13s-14f-02r-06r-07f".

TABLE 23

| LIQUIDITY: | Formula # | Score |
|---|---|---|
| Current Ratio | 1 | Strong |
| Current Ratio Change | 2 | Rise |
| Quick Ratio | 3 | Good |
| Quick Ratio Change | 4 | Rise |
| Net Income Margin Change | 6 | Rise |
| Net Income | 7 | Sig. Rise |
| Sales | 10 | Sig. Rise |

TABLE 24

| INCOME: | Formula # | Score |
|---|---|---|
| Net Income Margin | 5 | Good |
| Net Income Margin Movement | 6 | Rise |
| Net Income Movement | 7 | Sig. Rise |
| Gross Profit Margin | 8 | Rise |
| Gross Profit | 9 | Rise |
| Sales Percentage Change | 10 | Sig. Rise |

TABLE 25

| ASSETS: | Formula # | Score |
| --- | --- | --- |
| Use of Assets | 13 | Strong |
| Total Assets Change | 14 | Sig. Rise |
| Current Ratio Movement | 2 | Rise |
| Net Income Margin Movement | 6 | Rise |
| Net Income Movement | 7 | Sig. Rise |

In the respective combinations of assigned scores, "I" designates a set of formulas related to "Income", "L" designates a set of formulas related to "Liquidity", and "A" designates a set of formulas related to "Assets". The various numbers in the respective combinations of assigned scores identify respective formulas in the set of formulas related to "Liquidity", "Income", and "Assets", respectively. The lower-case letters in the respective combinations of assigned scores identify scores assigned to the various formula values in the respective sets of formulas. One or more portions of text associated with each combination (alphanumeric string) of assigned scores are retrieved from a database 16 (FIG. 1) and used to build a financial analysis report, as illustrated in FIGS. 4A–4J.

According to an embodiment of the present invention, each alphanumeric string corresponds to one or more respective paragraphs (e.g., one or more sentences). This is illustrated below in Table 26.

TABLE 26

| Alphanumeric String | Paragraph |
| --- | --- |
| S-10f-14f-16f | The company has done a good job in this area. Sales have risen significantly. In fact, sales are growing at a faster rate than the sales of most other companies in the industry. Even sales "scores" are based upon industry comparisons, and the firm is doing well. Although it is true that sales numbers in themselves are not that important, it's certainly good to increase performance in this key area over time. It looks like a significant number of people have been hired, and a significant amount of assets have been purchased as well. Let's try to think about which factor is most responsible for the sales increases. It may even be a factor that does not appear on the financial statements. It's important to identify what helps the company most in reaching its goals, so that the company can leverage that factor in the future. |
| S-10f-14f-16r | We're seeing nice results in this area. Sales have increased substantially. It looks like the company has also bought a substantial amount of assets, and it looks like additional people have been hired. The company is also generating more revenue per employee this period, a long run key performance indicator (KPI) in this particular industry. However, we won't draw too many conclusions in this section because the real goal is increasing profitability over time, as discussed in the profitability area. Sales increases, in and of themselves, do not tell us that much. |
| S-10f-14f-16m | Company sales have increased significantly. It looks like the firm has also added a substantial amount of fixed assets. If these assets have helped to drive sales higher, then the company should be generally pleased that the asset base is generating more sales dollars. Hopefully, this dynamic will help in earning greater profitability in the future. Let's also make a note that the employee base has stayed about the same as it was last period, so the firm is now generating more revenue per employee, which is a good sign. Pushing more revenue through each employee is a good START toward pushing more profitability through each employee. |

TABLE 26-continued

| Alphanumeric String | Paragraph |
| --- | --- |
| S-10f-14f-16d | Sales are up significantly from last period, but the organization has actually reduced the employee base. This dramatically improves revenue per employee, which is another measure of effectiveness in this particular industry. It could also indicate that the firm was a little top heavy with employees before. After all, sales are now higher with fewer people on staff. However, let's never go too far in our analysis of sales activities. As we discussed in the last section, the real challenge of management is to continually work on profitability over time. The company has seen good general work in this area. The sales have grown at a faster rate than the sales of many competitors. |

Illustrated in Table 26 are four alphanumeric strings relating to Sales and a respective paragraph associated with each one of the alphanumeric strings. Table 26 is a representation of only a portion of data storage, such as a table within a database, within which paragraphs for respective alphanumeric strings relating to "Liquidity", Profitability", "Sales", "Borrowing", "Assets", and "Employees" may be stored.

Referring now to FIGS. 4A–4J, a narrative financial analysis report 60 generated in accordance with the present invention is illustrated in HTML format. It is understood that narrative financial analysis reports generated in accordance with the present invention can be generated in various formats. The illustrated narrative financial analysis report 60 includes a title section 62, a plurality of analytical sections 64–74. Each analytical section 64–74 includes at least one or more sentences/paragraphs of text selected based on combinations of assigned scores, as described above. For example, in the Liquidity section 64 illustrated in FIG. 4A, the first, second and third paragraphs 64a, 64b, 64c are associated with the combination of assigned scores for "Liquidity" ("L-01s-02r-03g-04r-06r-07f-10f"). Similarly, other paragraphs within the remaining sections of the illustrative narrative analysis report are selected from the database utilizing respective combinations of assigned scores.

In the illustrated report 60, each analytical section 64–74 includes a rating icon that provides an indication of the performance of a business entity in a particular analytical section 64–74. For example, the performance of the illustrated business in the "Liquidity" section 64 is indicated via icon 65 as "poor." The performance of the illustrated business in the "Profits & Profit Margins" section 66 is indicated via icon 67 as "poor." The performance of the illustrated business in the "Sales" section 68 is indicated via icon 69 as "good." The performance of the illustrated business in the "Borrowing" section 70 is indicated via icon 71 as "good." The performance of the illustrated business in the "Assets" section 72 is indicated via icon 73 as "risky." The performance of the illustrated business in the "Employees" section 74 is indicated via icon 75 as "risky." In section 76, the raw data provided by a user is listed in tabular format.

In section 78 (illustrated in FIG. 4C), a plurality of charts 80, 82, 84 are provided that illustrate selected liquidity, profitability, and resource indicators. In particular, chart 80 illustrates selected liquidity indicators for quick ratio and current ratio. For example, bar graphs 80a and 80b indicate quick ratio for the business for the last period and the current period, respectively. Bar graph 80c indicates the average quick ratio of other businesses within the same industry. Similarly, bar graphs 80d and 80e indicate current ratio for the business for the last period and the current period, respectively. Bar graph 80f indicates the average current ratio of other businesses within the same industry.

Chart 82 illustrates selected profitability indicators for gross profit margin and net profit margin. For example, bar graphs 82a and 82b indicate gross profit margin for the business for the last period and the current period, respectively. Similarly, bar graphs 82c and 82d indicate net profit margin for the business for the last period and the current period, respectively. Bar graph 82e indicates the net profit margin of other businesses within the same industry.

Chart 84 illustrates selected resource indicators for the business. In particular, bar graph 84a indicates sales, bar graph 84b indicates net profit, bar graph 84c indicates debt, bar graph 84d indicates asset utilization, and bar graph 84e indicates employee utilization.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A method of producing a financial analysis report for a business entity, the method comprising the following operations performed by a data processing system:
   receiving financial information about a business entity for a selected time period;
   calculating a set including a plurality of financial values using the received financial information for the selected time period, wherein each financial value in the set is calculated from a respective one of a plurality of different financial formulas;
   comparing at least two of the financial values in the set with two or more financial values associated with other business entities within a selected industry;
   assigning a score to each of the two or more of the financial values in the set, wherein each assigned score reflects an assessment of financial performance of the business entity relative to other business entities within the selected industry;
   combining the two or more scores to produce a combination of the two or more scores;
   selecting one or more portions of stored text corresponding to the combination of scores, wherein the one or more portions of stored text comprise narrative financial analysis information; and
   building a document from the one or more portions of selected text to produce a narrative financial analysis report for the business entity, the narrative financial analysis report including text explaining a meaning of the combination of scores in a narrative format.

2. The method according to claim 1, wherein the financial formulas are selected from the group consisting of liquidity ratios, asset management ratios, debt management ratios, profitability ratios, and market value ratios.

3. The method according to claim 1, wherein the step of receiving financial information about the business entity comprises receiving financial information from a user via a computer network.

4. The method according to claim 1, further comprising the step of transmitting the narrative financial analysis report to a user via a computer network.

5. The method of claim 1 wherein the narrative financial analysis report includes text that explains relationships between scores in the combination for sets of financial values that relate to different financial performance indicators.

6. A method of producing a financial analysis report for a business entity, the method comprising the following operations performed by a data processing system:
   receiving financial information about a business entity for a selected first time period and a selected second time period, wherein the second time period is chronologically later than the first time period;
   calculating a first set including a plurality of financial values using the received financial information for the first time period, wherein each financial value in the first set is calculated from a respective one of a plurality of different financial formulas;
   calculating a second set including a plurality of financial values using the received financial information for the second time period, wherein each financial value in the second set is calculated from a respective one of the plurality of financial formulas;
   assigning a score to two or more of the financial values in the second set, wherein each assigned score reflects an assessment of change in financial performance from the first time period to the second time period;
   combining the two or more scores to produce a combination of the two or more scores;
   selecting one or more portions of stored text corresponding to one or more the combination of scores, wherein the one or more portions of stored text comprise narrative financial analysis information; and
   building a document from the one or more portions of selected text to produce a narrative financial analysis report for the business entity, the narrative financial analysis report including text explaining a meaning of the combination of scores in a narrative format.

7. The method according to claim 6, further comprising:
   comparing at least one of the financial values in the second set with one or more financial values associated with other business entities within a selected industry; and
   assigning a score to one or more of the financial values in the second set, wherein each assigned score reflects an assessment of financial performance of the business entity relative to other business entities within the selected industry.

8. The method according to claim 6, wherein the financial formulas are selected from the group consisting of liquidity ratios, asset management ratios, debt management ratios, profitability ratios, and market value ratios.

9. The method according to claim 6, wherein the step of receiving financial information about the business entity comprises receiving financial information from a user via a computer network.

10. The method according to claim 6, further comprising the step of transmitting the narrative financial analysis report to a user via a computer network.

11. The method of claim 6 wherein the narrative financial analysis report includes text that explains relationships between scores in the combination for sets of financial values that relate to different financial performance indicators.

12. A method of producing a financial analysis report for a business entity, the method comprising the following operations performed via an intermediary web site on a computer network:
   receiving financial information about a business entity from a client device in communication with the intermediary web site, wherein the financial information is for a selected time period;
   calculating a set including a plurality of financial values using the received financial information for the selected time period, wherein each financial value in the set is calculated from a respective one of a plurality of different financial formulas;
   comparing at least two of the financial values in the set with two or more financial values associated with other business entities within a selected industry;
   assigning a score to each of the two or more of the financial values in the set, wherein each assigned score reflects an assessment of financial performance of the business entity relative to other business entities within the selected industry;
   combining the two or more scores to produce a combination of the two or more scores;
   selecting one or more portions of stored text corresponding to the combination of scores, wherein the one or more portions of stored text comprise narrative financial analysis information;
   building a document from the one or more portions of selected text to produce a narrative financial analysis report for the business entity; and
   transmitting the narrative financial analysis report to the client device via the computer network, the narrative financial analysis report including text explaining a meaning of the combination of scores in a narrative format.

13. The method according to claim 12, wherein the financial formulas are selected from the group consisting of liquidity ratios, asset management ratios, debt management ratios, profitability ratios, and market value ratios.

14. The method of claim 12 wherein the narrative financial analysis report includes text that explains relationships between combinations scores in the combination for sets of financial values that relate to different financial performance indicators.

15. A method of producing a financial analysis report for a business entity, the method comprising the following operation performed via an intermediary web site on a computer network:
   receiving financial information about a business entity from a user in communication with the intermediary web site, wherein the financial information is for a selected first time period and a selected second time period, wherein the second time period is chronologically later than the first time period;
   calculating a first set including a plurality of financial values using the received financial information for the first time period, wherein each financial value in the first set is calculated from a respective one of a plurality of financial formulas;
   calculating a second set including a plurality of financial values using the received financial information for the second time period, wherein each financial value in the second set is calculated from a respective one of the plurality of different financial formulas;
   assigning a score to two or more of the financial values in the second set, wherein each assigned score reflects an assessment of change in financial performance from the first time period to the second time period;
   combining the two or more scores to produce a combination of the two or more scores;
   selecting one or more portions of stored text corresponding to the combination of scores, wherein the one or more portions of stored text comprise narrative financial analysis information;
   building a document from the one or more portions of selected text to produce a narrative financial analysis report for the business entity, the narrative financial analysis report including text explaining a meaning of the combination of scores in a narrative format; and
   transmitting the narrative financial analysis report to the client device via the computer network.

16. The method according to claim 15, further comprising:
   comparing at least one of the financial values in the second set with one or more financial values associated with other business entities within a selected industry; and
   assigning a score to one or more of the financial values in the second set, wherein each assigned score reflects an assessment of financial performance of the business entity relative to other business entities within the selected industry.

17. The method according to claim 15, wherein the financial formulas are selected from the group consisting of liquidity ratios, asset management ratios, debt management ratios, profitability ratios, and market value ratios.

18. The method of claim 15 wherein the narrative financial analysis report includes text that explains relationships between scores in the combination for sets of financial values that relate to different financial performance indicators.

19. A data processing system for producing a financial analysis report for a business entity, comprising:
   means for receiving financial information about a business entity for a selected time period;
   means for calculating a set including a plurality of financial values using the received financial information for the selected time period, wherein each financial value in the set is calculated from a respective one of a plurality of different financial formulas;
   means for comparing at least two of the financial values in the set with two or more financial values associated with other business entities within a selected industry;
   means for assigning a score to each of the two or more of the financial values in the set, wherein each assigned score reflects an assessment of financial performance of the business entity relative to other business entities within the selected industry;
   means for combining the two or more scores to produce a combination of the two or more scores;
   means for selecting one or more portions of stored text corresponding to the combination of scores, wherein the one or more portions of stored text comprise narrative financial analysis information; and
   means for building a document from the one or more portions of selected text to produce a narrative financial analysis report for the business entity, the narrative financial analysis report including text explaining a meaning of the combination of scores in a narrative format.

20. The data processing system according to claim 19, wherein the financial formulas are selected from the group consisting of liquidity ratios, asset management ratios, debt management ratios, profitability ratios, and market value ratios.

21. The data processing system according to claim 19, wherein the means for receiving financial information about the business entity comprises means for receiving financial information from a user via a computer network.

22. The data processing system according to claim 19, further comprising means for transmitting the narrative financial analysis report to a user via a computer network.

23. The data processing system of claim 19 wherein the narrative financial analysis report includes text that explains relationships between scores in the combination for sets of financial values that relate to different financial performance indicators.

24. A data processing system for producing a financial analysis report for a business entity, comprising:
   means for receiving financial information about a business entity for a selected first time period and a selected second time period, wherein the second time period is chronologically later than the first time period;
   means for calculating a first set including a plurality of financial values using the received financial information for the first time period, wherein each financial value in the first set is calculated from a respective one of a plurality of different financial formulas;
   means for calculating a second set including a plurality of financial values using the received financial information for the second time period, wherein each financial value in the second set is calculated from a respective one of the plurality of financial formulas;
   means for assigning a score to two or more of the financial values in the second set, wherein each assigned score reflects an assessment of change in financial performance from the first time period to the second time period;
   means for combining the two or more scores to produce a combination of the two or more scores;
   means for selecting one or more portions of stored text corresponding to the combination of scores, wherein the one or more portions of stored text comprise narrative financial analysis information; and
   means for building a document from the one or more portions of selected text to produce a narrative financial analysis report for the business entity, the narrative financial analysis report including text explaining a meaning of the combination of scores in a narrative format.

25. The data processing system according to claim 24, further comprising:
   means for comparing at least one of the financial values in the second set with one or more financial values associated with other business entities within a selected industry; and
   means for assigning a score to one or more of the financial values in the second set, wherein each assigned score reflects an assessment of financial performance of the business entity relative to other business entities within the selected industry.

26. The data processing system according to claim 24, wherein the financial formulas are selected from the group consisting of liquidity ratios, asset management ratios, debt management ratios, profitability ratios, and market value ratios.

27. The data processing system according to claim 24, wherein the means for receiving financial information about the business entity comprises means for receiving financial information from a user via a computer network.

28. The data processing system according to claim 24, further comprising means for transmitting the narrative financial analysis report to a user via a computer network.

29. The data processing system of claim 24 wherein the narrative financial analysis report includes text that explains relationships between scores in the combination for sets of financial values that relate to different financial performance indicators.

30. A computer program product for producing a financial analysis report for a business entity, the computer program product comprising a computer usable storage medium having computer readable program code embodied in the medium, the computer readable program code comprising:
   computer readable program code for receiving financial information about a business entity for a selected time period;
   computer readable program code for calculating a set including a plurality of financial values using the received financial information for the selected time period, wherein each financial value in the set is calculated from a respective one of a plurality of different financial formulas;
   computer readable program code for comparing at least one two of the financial values in the set with two or more financial values associated with other business entities within a selected industry;
   computer readable program code for assigning a score to each of the two or more of the financial values in the set, wherein each assigned score reflects an assessment of financial performance of the business entity relative to other business entities within the selected industry;
   computer readable program code for combining the two or more scores to produce a combination of the two or more scores;
   computer readable program code for selecting one or more portions of stored text corresponding to the combination of scores, wherein the one or more portions of stored text comprise narrative financial analysis information; and
   computer readable program code for building a document from the one or more portions of selected text to produce a narrative financial analysis report for the business entity, the narrative financial analysis report including text explaining a meaning of the combination of scores in a narrative format.

31. The computer program product according to claim 30, wherein the financial formulas are selected from the group consisting of liquidity ratios, asset management ratios, debt management ratios, profitability ratios, and market value ratios.

32. The computer program product according to claim 30, wherein the computer readable program code for receiving financial information about the business entity comprises computer readable program code for receiving financial information from a user via a computer network.

33. The computer program product according to claim 30, further comprising computer readable program code for transmitting the narrative financial analysis report to a user via a computer network.

34. The computer program product of claim 30 wherein the narrative financial analysis report includes text that explains relationships between scores in the combination for sets of financial values that relate to different financial performance indicators.

35. A computer program product for producing a financial analysis report for a business entity, the computer program product comprising a computer usable storage medium having computer readable program code embodied in the medium, the computer readable program code comprising:

computer readable program code for receiving financial information about a business entity for a selected first time period and a selected second time period, wherein the second time period is chronologically later than the first time period;

computer readable program code for calculating a first set including a plurality of financial values using the received financial information for the first time period, wherein each financial value in the first set is calculated from a respective one of a plurality of different financial formulas;

computer readable program code for calculating a second set including a plurality of financial values using the received financial information for the second time period, wherein each financial value in the second set is calculated from a respective one of the plurality of financial formulas;

computer readable program code for assigning a score to two or more of the financial values in the second set, wherein each assigned score reflects an assessment of change in financial performance from the first time period to the second time period;

computer readable program code for combining the two or more scores to produce a combination of the two or more scores;

computer readable program code for selecting one or more portions of stored text corresponding to the combination of scores, wherein the one or more portions of stored text comprise narrative financial analysis information; and computer readable program code for building a document from the one or more portions of selected text to produce a narrative financial analysis report for the business entity, the narrative financial analysis report including text explaining a meaning of the combination of scores in a narrative format.

36. The computer program product according to claim 35, further comprising:

computer readable program code for comparing at least one of the financial values in the second set with one or more financial values associated with other business entities within a selected industry; and computer readable program code for assigning a score to one or more of the financial values in the second set, wherein each assigned score reflects an assessment of financial performance of the business entity relative to other business entities within the selected industry.

37. The computer program product according to claim 35, wherein the financial formulas are selected from the group consisting of liquidity ratios, asset management ratios, debt management ratios, profitability ratios, and market value ratios.

38. The computer program product according to claim 35, wherein the computer readable program code for receiving financial information about the business entity comprises computer readable program code for receiving financial information from a user via a computer network.

39. The computer program produce according to claim 35, further comprising computer readable program code for transmitting the narrative financial analysis report to a user via a computer network.

40. The computer program product of claim 35 wherein the narrative financial analysis report includes text that explains relationships between scores in the combination for sets of financial values that relate to different financial performance indicators.

41. A data processing system comprising:

a database comprising stored portions of text, wherein each stored potions of text is associated with a combination of scores assigned to one or more financial values within a set of financial formulas;

a server, comprising:

means for receiving financial information about a business entity for a selected first time period and a selected second time period, wherein the second time period is chronologically later than the first time period;

means for calculating a first set including a plurality of financial values using the received financial information for the first time period, wherein each financial value in the first set is calculated from a respective one of a plurality of financial formulas;

means for calculating a second set including a plurality of financial values using the received financial information for the second time period, wherein each financial value in the second set is calculated from a respective one of the plurality of different financial formulas;

means for assigning a score to each of the two or more of the financial values in the second set, wherein each assigned score reflects an assessment of change in financial performance from the first time period to the second time period;

means for combining the two or more scores to produce a combination of the two or more scores;

means for selecting one or more portions of stored text corresponding to the combination of scores, wherein the one or more portions of stored text comprise narrative financial analysis information; and means for building a document from the one or more portions of selected text to produce a narrative financial analysis report for the business entity, the narrative financial analysis report including text explaining a meaning of the combination of scores in a narrative format.

42. The data processing system according to claim 41, wherein the server further comprises:

means for comparing at least one of the financial values in the second set with one or more financial values associated with other business entities within a selected industry; and means for assigning a score to one or more of the financial values in the second set, wherein each assigned score reflects an assessment of financial performance of the business entity relative to other business entities within the selected industry.

43. The data processing system according to claim 41, wherein the financial formulas are selected from the group consisting of liquidity ratios, asset management ratios, debt management ratios, profitability ratios, and market value ratios.

44. The data processing system according to claim 41, wherein the means for receiving financial information about the business entity comprises means for receiving financial information from a user via a computer network.

45. The data processing system according to claim 41, further comprising means for transmitting the narrative financial analysis report to a user via a computer network.

46. The computer program product of claim 41 wherein the narrative financial analysis report includes text that explains relationships between scores in the combination for sets of financial values that relate to different financial performance indicators.

* * * * *